United States Patent [19]
Severinghaus

[11] 3,750,649
[45] Aug. 7, 1973

[54] PULMONARY IMPEDANCE BRIDGE

[75] Inventor: John W. Severinghaus, Ross, Calif.

[73] Assignee: The Regents of the University of California, Berkeley, Calif.

[22] Filed: June 25, 1971

[21] Appl. No.: 156,667

[52] U.S. Cl. .......................... 128/2.1 Z, 128/2.05 V
[51] Int. Cl. .............................................. A61b 5/05
[58] Field of Search ...................... 128/2.1 Z, 2.1 R, 128/2.1 E, 2 R, 2.05 V

[56] References Cited
UNITED STATES PATENTS

| | | | |
|---|---|---|---|
| 3,608,543 | 9/1971 | Longhini et al. | 128/2.1 Z |
| 3,340,867 | 9/1967 | Kubicek et al. | 128/2.05 V |
| 3,452,743 | 7/1969 | Rieke | 128/2.1 Z |
| 2,184,511 | 12/1939 | Bagno et al. | 128/2.1 Z |
| 3,149,627 | 9/1964 | Bagno | 128/2.1 Z |

Primary Examiner—Kyle L. Howell
Attorney—Gregg et al.

[57] ABSTRACT

Apparatus for measurement of lung resistance includes a low voltage and high frequency power supply connected to a driver electrode contacting one side of a chest with a detector electrode contacting the opposite side of the chest and a pickup electrode engaging the chest therebetween. A variable resistor is connected with other resistors between the detector and pickup electrodes to form a bridge circuit with a portion of the lung resistance and a meter connected to the detector electrode indicates bridge balance whereat the resistance of the variable resistor is equal to the resistance of a portion of the lung. A guard ring about the detector electrode has segments thereof driven by operational amplifiers from the detector electrode to substantially eliminate skin potential gradients laterally of the detector.

5 Claims, 4 Drawing Figures

INVENTOR.
JOHN W. SEVERINGHAUS
BY
Gregg, Henderson & Caplan
ATTORNEYS

INVENTOR.
JOHN W. SEVERINGHAUS
BY
Gregg, Henderson & Caplan
ATTORNEYS

PULMONARY IMPEDANCE BRIDGE

The invention described herein was made in the performance of work under research grants from the United States Public Health Service.

BACKGROUND OF INVENTION

It is recognized that the lung, being about 80 percent air and only about 5 percent extracellular fluid, has a high resistance and that the resistance thereof is more subject to variation than that of other tissue, as the volume of gas, blood and extracellular fluid varies. Prior workers have monitored edema formation in lungs by the direct application of electrodes to lung surfaces and measurement of resistance changes of the lung. Attempts to accurately measure or monitor lung impedance values through the intact chest wall have, however, been only limitedly successful because of the short circuiting effect of the more conductive surrounding tissues.

Numerous advancements in the general field of resistance measurements of human tissue have been made. In this respect please note U.S. Pat. No. 2,184,511 to Bagno setting forth a 4 electrode system to avoid skin contact resistance as well as other patents of this same inventor. U.S. Pat. No. 3,340,867 to Kubicek et al. describes an instrument primarily useful in determining heart size, cardiac output, blood volume in the chest and the like, but in this instrument most of the current passes through the mediastinum and chest wall rather than the lungs. What may be termed a major advance in the field is described by Graham in the publication IEEE Transactions on BioMedical Engineering, July-October 1965, and the system thereof employs a guard ring to limit the volume involved in impedance measurement. Somewhat similar to the guard ring concept is the body impedance bridge set forth in U.S. Pat. No. 3,452,743 to Rieke wherein electrodes are particularly energized in an attempt to electromagnetically focus the current through a desired portion of a body.

Although many prior art advances have been made in resistance or impedance measurements of body tissues, there remain numerous problems in attempting to accurately measure or monitor unilateral lung resistance. In addition to the problems of skin current, at least in part solved by certain of the above-noted systems, there remains the problem of current flow through alternative body members besides the lung desired to be tested.

SUMMARY OF INVENTION

The system of the present invention employs a relatively high frequency current generator to apply low voltage electrical energy to one side of a chest cavity for determination of the electrical resistance of the lung by a detector located at the opposite side of the cavity. The generator and detector are disposed on lateral sides of a chest. A segmented guard ring is disposed about the detector and the segments thereof are maintained at appropriate voltages to prevent or preclude surface current flow from the generator to the detector. The guard ring segments are energized through a feedback amplifier sensing skin potential with a small detecting electrode located between the detector and guard electrode segment.

Lung resistance is measured by balancing a bridge comprising body tissue underlying the detector electrode and extending to the body midline as established by a midline pickup electrode driving an inverter amplifier, a manually variable resistor and a pair of fixed resistors. The bridge is driven by equal voltages of opposite phase so that balancing of the bridge with the manually adjustable balance resistor equates the lung and balance resistance.

DESCRIPTION OF FIGURES

The present invention is illustrated as to a particular preferred embodiment thereof in the accompanying drawings wherein.

DESCRIPTION OF PREFERRED EMBODIMENT

Figure 1:
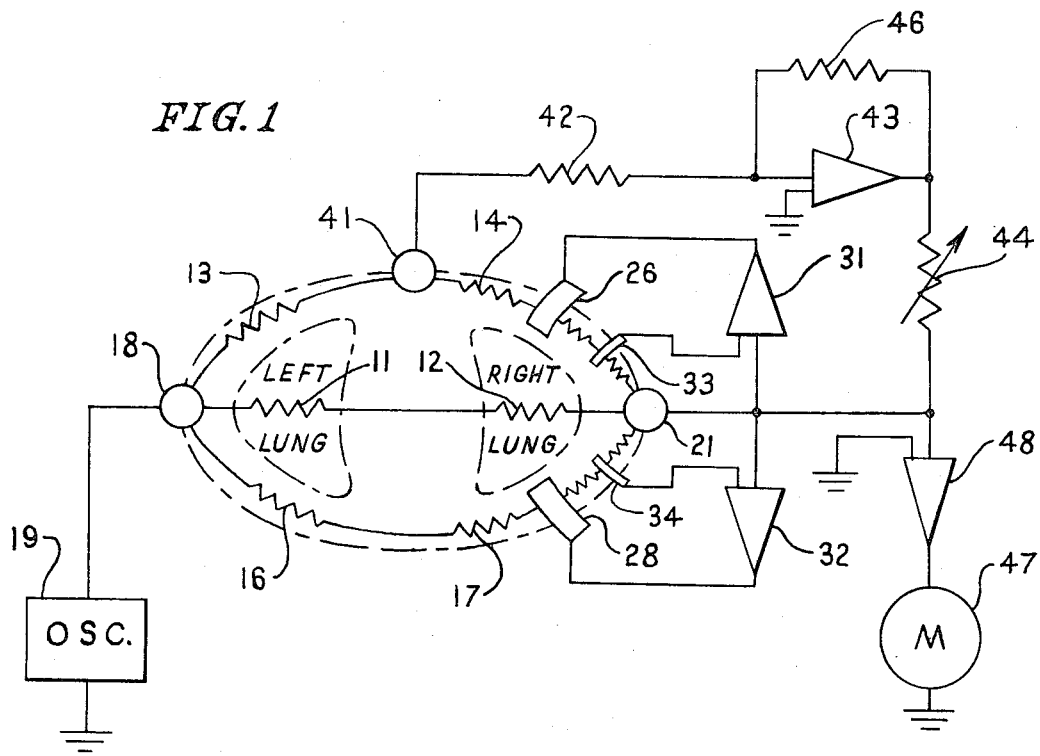
FIG. 1 is a schematic representation of the system of the present invention including body tissue resistances.
Figure 2:
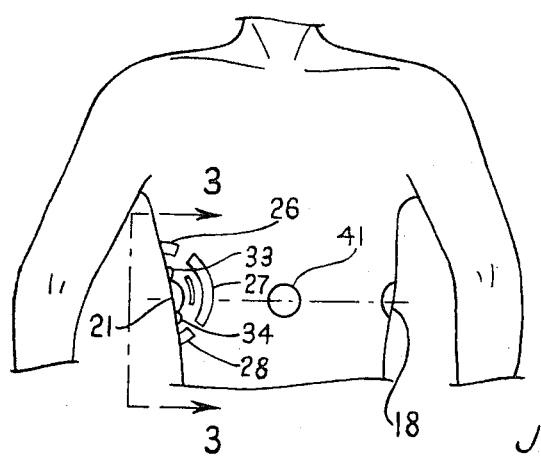
FIG. 2 is an illustration of the placement of electrodes of the present invention on the body of a man for measurement of lung resistance.

The invention is schematically illustrated in FIG. 1 of the drawings and, referring thereto, it will be seen to be generally illustrated a transverse mid-chest section including left and right lungs having resistances 11 and 12 to be measured or monitored by the system of the present invention. It is known that, inasmuch as the lung is largely composed of air, the resistance thereof is quite high. Chest wall resistances are indicated by the resistors 13, 14, 16 and 17. The resistance of the chest wall is somewhat less than that of the lungs themselves and consequently difficulties are normally encountered in attempting to measure the lung resistance because of the lower resistance paths available through and along the chest wall. The present invention provides for attaching a drive electrode 18 to one side of the chest wall and connecting a high frequency generator 19 thereto. This generator produces a low voltage low current output as, for example, a 0.1 peak-to-peak voltage at 100 KHz.

Figure 3:
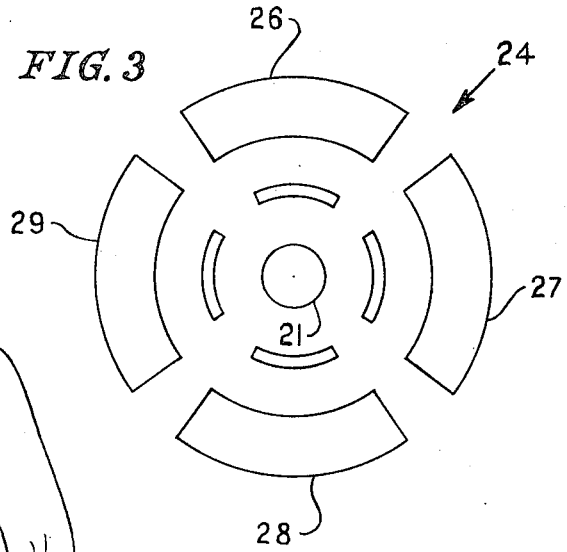
FIG. 3 is an illustration of guard ring electrodes and detector electrode in position upon a chest wall as viewed in the plane 3—3 of FIG. 2.

On the opposite side of the chest cavity there is disposed a detector electrode 21 adapted to receive current flow from the drive electrode 18. In accordance with prior art teachings, as set forth above, the present invention incorporates what may be termed guard rings. The theory of a guard ring, as set forth by Graham, is to surround the detector electrode with another electrode maintained at the same potential so that current flow from a generator through the chest wall will terminate at the guard ring rather than reaching the detector. Although the present invention employs what may be termed a guard ring, certain major departures from the prior art are incorporated herein. Referring first to FIG. 3, there will be seen to be illustrated a guard ring 24 segmented into quadrants as electrodes 26, 27, 28 and 29. Rather than maintain the guard ring segments at the same potential as the detector electrode 21, the present invention provides for substantially eliminating the skin potential gradient laterally of the detector by the utilization of operational or feedback amplifiers connected between the detector and guard ring segments.

Referring to FIG. 1, wherein two guard ring segments 26 and 28 are shown, there will be seen to be provided operational amplifiers 31 and 32 connected between the detector electrode 21 and the guard rings 26 and 28 respectively. These amplifiers are inverting amplifiers and each amplifier has a second input thereof connected to guard pickup electrodes 33 and 34. These pickup electrodes 33 and 34 engage the skin of the chest wall midway between the detector electrode 21 and guard ring segments. It will thus be seen the amplifier 31, for example, may be considered as a feedback amplifier with a portion of the chest wall resist-ance employed as the feedback resistor. With these amplifiers having a gain of 200, for example, an amplifier picks up, amplifies and inverts the potential existing across the portion of the chest wall and drives the guard ring segment to thereby eliminate the lateral potential gradient to 1 part in 200. This then serves to focus the electric field within the chest cavity indenpendently of balance so that the current of the dector electrode is primarily normal to the chest wall surface through the underlying cylinder of lung tissue. Segmenting the ring 24 provides for matching the guard current to chest wall current in separate quadrants.

The present invention is particularly adapted to measurement or monitoring of unilateral lung resistance or impedance. This is herein accomplished by the provision of a bridge circuit again as schematically illustrated in FIG. 1. A midline electrode 41 is engaged with the body at the center line thereof as, for example, at the sternum. This center line or center plane is commonly termed mediastinum and it will be seen that the electrode 41 then assumes a potential of the mediastinum. The electrode 41 is connected through a resistor 42 to one input of an inverter 43 having the output connected through a balance resistor 44 to the detector electrode 21. The balance resistor may comprise a calibrated 1000 ohm, ten turn potentiometer. The bridge is completed by a resistor 46 connected between resistors 42 and 44 across the inverter 43. The bridge is thus formed of resistors 42, 46 and 44 together with the resistance 12 of the right lung. A null meter 47 is coupled by a phase sensing detector amplifier 48 to the detector electrode 21. It will, of course, be appreciated that the potential of the electrode 41 at the mediastinum is an intermediate potential between the drive electrode 18 and detector electrode 21, whose magnitude depends on the distribution of conductivity within the body and the size and placement of the electrodes.

Figure 4:
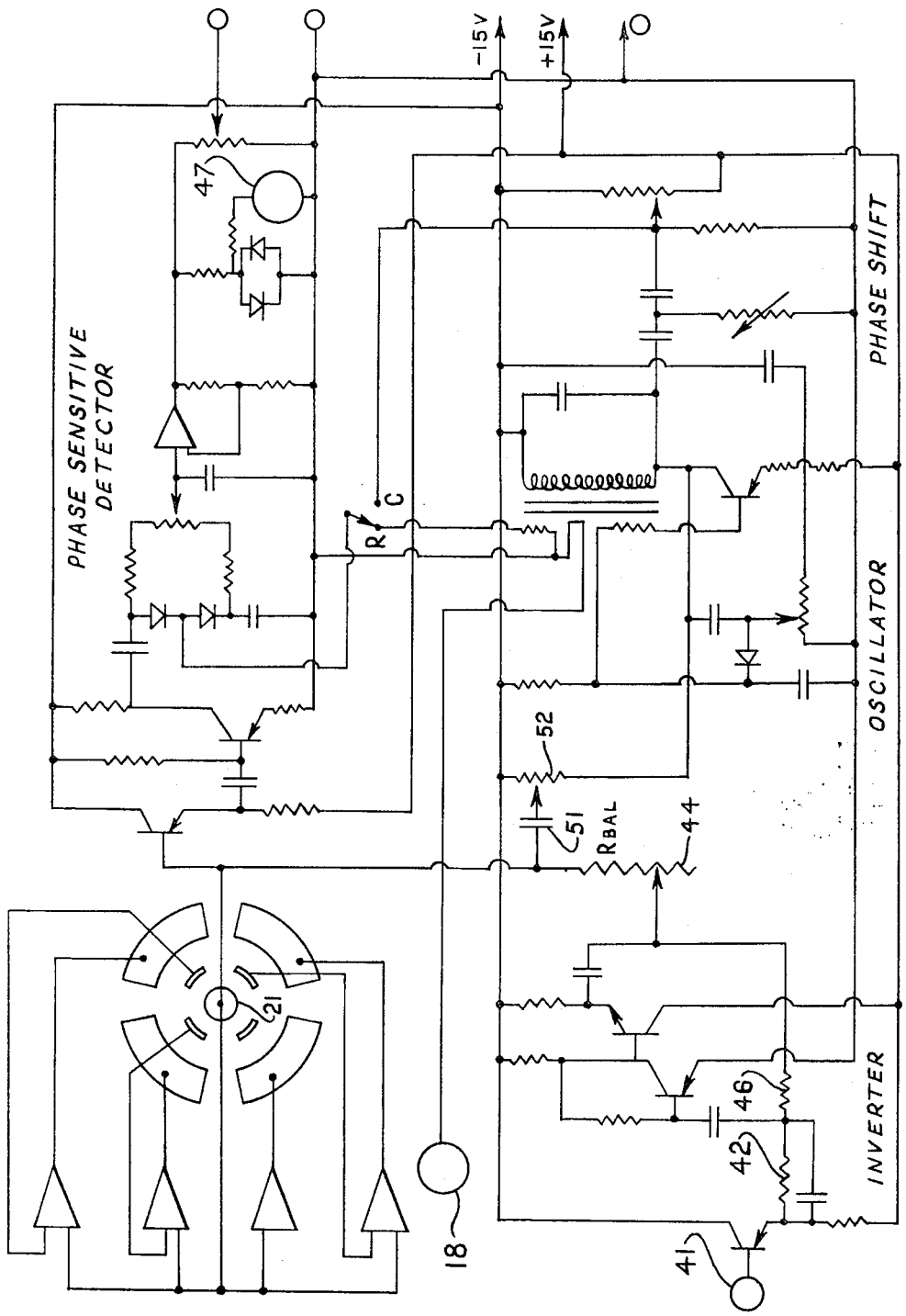
FIG. 4 is a circuit diagram of the impedance bridge of the present invention.

The actual electronics employed in the block diagram of FIG. 1 hereof, may take a variety of forms and one example thereof is illustrated in FIG. 4. Inasmuch as the electronics themselves are considered to be conventional, no detailed discussion of this Figure is included herein other than to generally note that the major portions of the circuitry are identified in FIG. 4 and that, insofar as electrodes and the like are concerned, the same numerals are employed in FIG. 4 as in FIG. 1. It is noted that the impedance of coupling 51 is very high compared to variable resistor 52 so that current fed into the detector electrode leads the generator voltage by almost 90° so that the resistor 52 may be employed to balance capacitive reactance in the chest. Operation of the circuit of FIG. 4 is believed to be apparent to those skilled in the art from the foregoing description of the block diagram of FIG. 1.

With regard to utilization of the present invention, it is noted that the segmented guard and method of driving same provided herein accomplishes the results of focusing the electric field within the chest cavity so that the measured current flows substantially perpendicularly to the chest wall toward the detector electrode. The guard pickup electrodes, such as electrodes 33 and 34 of FIG. 1, are placed co-planar with the detector electrode, although the guard ring segments may be contoured to fit the chest wall. It is also noted that the size of the guard ring 24 influences the electric field deep within the chest cavity and consquently affects the measured lung resistance. As an example of the present invention the radii of the guard rings may be 50 to 105 millimeters, the radius of the detector 30 millimeters, and the radii of the guard pickup electrodes 36 to 37 millimeters.

The apparatus of the present invention is particularly suited to the measurement of partial or unilateral lung impedance in vivo. Such measurements are useful in identifying and/or monitoring pulmonary edema in man and extensive testing has established the advantages and accuracy of this invention. It is not intended to limit the present invention to the precise terms of description nor details of illustration for numerous variations will be apparent to those skilled in the art.

What is claimed is:

1. A pulmonary impedance bridge for measure-ment of lung impedance comprising
    a driver electrode adapted for connection to a power supply and to one lateral side of the chest of a torso including a lung,
    a detector electrode adapted for connection to the other lateral side of said chest,
    an electrically conducting guard ring adapted for disposition about said detector on said chest,
    a pickup electrode adapted for disposition on the mediastinum of said torso,
    a variable resistor connected to said detector electrode,
    first and second resistors connected in series between said pickup electrode and said variable resistor,
    an inverter connected across said second resistor, and
    a meter connected to the junction of said detector electrode and said variable resistor for indicating balance of a bridge formed by said resistors and the resistance of the lung between the mediastinum and detector electrode as established by varying the value of said variable resistor,
    whereby the adjusted value of said variable resistor at balance of said bridge is equal to the resistance of said lung between the mediastinum and detector.

2. Apparatus for measuring and monitoring resistance of a lung in vivo comprising
    a. a driver electrode adapted for connection to a power supply and engagement with a first lateral side of a chest wall,
    b. a detector electrode adapted for engagement with the other lateral side of said chest wall,
    c. a high frequency and low voltage power supply connected between said driver and detector electrodes,
    d. an electrically conducting guard ring adapted for engagement with said chest wall about said detector electrode and out of contact therewith,
    e. a pickup electrode adapted for enagement with said chest on the mediastinum thereof,
    f. a variable balance resistor connected to said detector electrode, g. first and second bridge resistors connected in series between said pickup electrode and balance resistor to form a bridge with said balance resistor and the lung between said pickup electrode and detector electrode, h. an inverter connected across said second bridge resistor for energizing said bridge with substantially equal voltages of opposite phase, and i. means indicating current flow from said detector electrode to said power supply as an indication of bridge unbalance whereby the resistance value of said balance resistor at zero current flow is the resistance of a lung between said mediastinum and detector electrode.

3. Apparatus as set forth in claim 2 further defined by said guard ring being divided circumferentially into a plurality of segments, a plurality of guard pickup electrodes disposed one between each guard ring segment and said detector electrode and adapted to contact with the chest wall, and amplifier means connected between said detector electrode and guard ring segments and controlled by the potentials of said guard pickup electrodes for eliminating potential gradient between detector electrode and guard ring segments.

4. In apparatus for measurement of lung resistance including a detector electrode adapted to engage a first side of a chest wall and a driver electrode energized by a low voltage high frequency power supply and adapted to engage a second opposite side of said chest wall, the improvement comprising a guard ring divided into circumferential segments disposed about said detector electrode in engagement with said chest wall, a plurality of feedback amplifiers separately connected between said detector electrode and guard ring segments, and pickup electrodes adapted to engage the chest wall between said detector electrode and respective guard ring segments and separately connected to feedback inputs of said amplifiers for matching the segment currents to chest wall currents.

5. In apparatus for measuring lung resistance including a detector electrode adapted to engage one side of a chest wall and a driver electrode adapted to engage an opposite side of a chest wall and connected to a power supply, the improvement comprising a pickup electrode adapted to engage the chest wall intermediate the detector and driver electrodes, resistors including a variable balance resistor connected between said pickup and detector electrodes to form a bridge circuit with the resistance of tissue underlying said detector electrode, an inverter coupled between said pickup electrode and balance resistor, and a meter coupled to said detector electrode for indicating balance of said bridge by variation of said balance resistor as a measurement of the resistance of a part of the lungs.

* * * * *